United States Patent
Lee

(10) Patent No.: US 11,100,629 B2
(45) Date of Patent: Aug. 24, 2021

(54) APPEARANCE INSPECTING APPARATUS FOR ARTICLE AND APPEARANCE INSPECTING METHOD FOR ARTICLE USING THE SAME

(71) Applicant: KOH YOUNG TECHNOLOGY INC., Seoul (KR)

(72) Inventor: Bok Yeo Lee, Seoul (KR)

(73) Assignee: KOH YOUNG TECHNOLOGY INC., Seoul (KR)

( * ) Notice: Subject to any disclaimer, the term of this patent is extended or adjusted under 35 U.S.C. 154(b) by 64 days.

(21) Appl. No.: 16/094,970

(22) PCT Filed: Apr. 20, 2017

(86) PCT No.: PCT/KR2017/004238
§ 371 (c)(1),
(2) Date: Oct. 19, 2018

(87) PCT Pub. No.: WO2017/183923
PCT Pub. Date: Oct. 26, 2017

(65) Prior Publication Data
US 2019/0147575 A1 May 16, 2019

(30) Foreign Application Priority Data
Apr. 20, 2016 (KR) .................. 10-2016-0048299

(51) Int. Cl.
*G06T 7/00* (2017.01)
*G06T 7/11* (2017.01)

(52) U.S. Cl.
CPC ............ *G06T 7/001* (2013.01); *G06T 7/0004* (2013.01); *G06T 7/11* (2017.01);
(Continued)

(58) Field of Classification Search
CPC ......... G06T 7/001; G06T 7/0004; G06T 7/11; G06T 2207/10024; G06T 2207/30164; G06T 2207/10152; G06T 2207/30168
See application file for complete search history.

(56) References Cited

U.S. PATENT DOCUMENTS

| 5,091,963 A | 2/1992 | Litt et al. |
| 2005/0151760 A1 | 7/2005 | Kim et al. |
| 2016/0033368 A1 | 2/2016 | Neau |

FOREIGN PATENT DOCUMENTS

| CN | 102084213 | 6/2011 |
| EP | 2 295 930 | 3/2011 |

(Continued)

OTHER PUBLICATIONS

Jihong Chen et al.; "Avoiding Spurious Reflections From Shiny Surfaces on a 3D Real-Time Machine Vision Inspection System"; IEEE Instrumentation and Measurement Technology Conference, dated May 18-21, 1998; pp. 364-368.
(Continued)

*Primary Examiner* — Qian Yang
(74) *Attorney, Agent, or Firm* — Kile Park Reed & Houtteman PLLC

(57) ABSTRACT

An appearance inspecting apparatus for an article includes an image acquiring section acquiring a captured image for at least a portion of appearance of the article and a processing section that uses the captured image of the article to determine whether the appearance of the article is defective or not. The processing section acquires first image data for an inspection region including at least a portion of the captured image, acquires an equation that follows trend of levels of the first image data according to a location in the inspection region, and acquires second image data based on relative levels between the equation and the levels of the first image data. Thus, it may be easily and precisely determined
(Continued)

whether the appearance of the article is defective or not even though the appearance of the article does not have a flat plane shape.

12 Claims, 11 Drawing Sheets

(52) U.S. Cl.
CPC .............. *G06T 2207/10024* (2013.01); *G06T 2207/10152* (2013.01); *G06T 2207/30164* (2013.01)

(56) References Cited

FOREIGN PATENT DOCUMENTS

| | | |
|---|---|---|
| JP | 2005-292081 | 10/2005 |
| JP | 2008-0267836 | 11/2008 |
| JP | 2008-292430 | 12/2008 |
| JP | 2010-91514 | 4/2010 |
| JP | 2010-256053 | 11/2010 |
| JP | 2013-096972 | 5/2013 |
| JP | 2015-038466 | 2/2015 |
| JP | 2015-148447 | 8/2015 |
| KR | 10-2009-0052369 | 5/2009 |
| KR | 10-2011-0105512 | 9/2011 |

OTHER PUBLICATIONS

European Search Report corresponding to European Application No. EP 17 78 6191 dated Apr. 8, 2019.
International Search Report for International Application No. PCT/KR2017/004238; dated Aug. 30, 2017.

APPEARANCE INSPECTING APPARATUS FOR ARTICLE AND APPEARANCE INSPECTING METHOD FOR ARTICLE USING THE SAME

TECHNICAL FIELD

The present invention relates to an appearance inspecting apparatus for an article and an appearance inspecting method for an article using the same. More particularly, the present invention relates to an appearance inspecting apparatus for an article which judges whether the article is defective and an appearance inspecting method for an article using the same.

BACKGROUND ART

In general, various articles produced by various processing methods may have defects in terms of their functions, but may also have defects in appearance due to problems in the processing process or external factors.

If this appearance is defective, it may cause a functional problem, and it may cause a design problem even though there is no defect in function. Thus, recently, a process of inspecting the appearance of an intermediate article or a final finished product occurring in the process of manufacturing an article is required.

Conventionally, the inspection process is performed entirely by hand, or a process has been employed in which an image is captured with respect to an inspection target article and the captured image is manually checked.

However, this method greatly increases the cost of the inspection, and it is difficult to secure the reliability and uniformity of quality due to various external factors such as skill, fatigue, labor environment, etc. of an operator, and the time for performing the inspection is greatly increased, thereby incurring a problem that productivity of an article is lowered.

In order to solve such a problem, when it is intended to automatically perform an appearance inspection using a captured image of an inspection target article, in the case of an article including a plurality of rounded portions having various shapes, it is difficult to secure the precision of the inspection.

Therefore, it is required to develop an appearance inspecting apparatus and an appearance inspecting method that may easily and accurately judge whether an appearance of an article is defective or not, even when the appearance of the article does not have a plane shape such that the appearance has various shapes and includes a rounded portion.

DISCLOSURE

Technical Problem

Accordingly, the present invention provides an appearance inspecting apparatus for an article capable of easily and precisely determining whether the appearance of the article is defective or not even though the appearance of the article does not have a flat plane shape by acquiring second data relative to an equation representing first data for an inspection region and determining whether the appearance of the article is defective or not based on the acquired second data; easily determining whether the appearance of the article is defective or not by applying plane inspection criteria, which are applied in case that the inspection region corresponds to a plane, directly to the second image data; easily acquiring the equation by easily acquiring the first data using a two-dimensional plane image or data acquired for measuring a three-dimensional shape and performing curve-fitting; obtaining a more accurate inspection result by acquiring and excluding a hole and the like formed in the article as a masking region and excluded; acquiring a more accurate equation by removing a noise region from the inspection region and then modifying the equation; and obtaining a more accurate inspection result by performing data processing or image processing of the second data.

In addition, the present invention also provides an appearance inspecting method for an article using the above-mentioned appearance inspecting apparatus for an article.

Technical Solution

According to an exemplary embodiment of the present invention, an appearance inspecting apparatus for an article includes an image acquiring section acquiring a captured image for at least a portion of appearance of the article and a processing section that uses the captured image of the article to determine whether the appearance of the article is defective or not. The processing section acquires first image data for an inspection region including at least a portion of the captured image, acquires an equation that follows trend of levels of the first image data according to a location in the inspection region, and acquires second image data based on relative levels between the equation and the levels of the first image data.

In one embodiment, the second image data may be acquired from a distance between the first image data and a value according to the equation, with respect to each location in the inspection region.

The processing section may determine whether the appearance of the article is defective or not based on the second image data. The processing section may determine whether the appearance of the article is defective or not by applying plane inspection criteria to the second image data. Herein, the plane inspection criteria are inspection criteria that are applied in case that the inspection region corresponds to a plane.

In one embodiment, the appearance inspecting apparatus may further include at least one of a first lighting section providing non-patterned light and a second lighting section providing patterned light. The first image data may include at least one of brightness data acquired from the first lighting section and height data acquired from the second lighting section.

For example, at least a portion of the inspection region may correspond to a rounded portion, and the processing section may determine whether the appearance of the article is defective or not by applying plane inspection criteria, which are applied in case that the inspection region corresponds to a plane, to the second image data.

For example, the inspection region may be a one-dimensional region or a two-dimensional region, and the equation that follows trend of levels of the first image data may be an equation for a region having a same dimension as the inspection region. That is, in one embodiment, the inspection region may be a one-dimensional region, and the equation that follows trend of levels of the first image data may be for the one-dimensional region. In another embodiment, the inspection region may be a two-dimensional region, and the equation that follows trend of levels of the first image data may be for the two-dimensional region.

In addition, the inspection region may be a two-dimensional region, and the processing section may acquire equations for one-dimensional regions forming the two-dimensional inspection region, and may acquire an equation for the two-dimensional inspection region based on the equations for the one-dimensional regions.

In one embodiment, the processing section may obtain the second data for each location by subtracting values according to the equation from the first data for each location in the inspection region.

The processing section may establish a target region in the captured image, acquire a masking region that is to be excluded from the target region, and establish the inspection region by excluding the masking region from the target region. Herein, the processing section may acquire a region of the first data beyond a predetermined range as the masking region.

In one embodiment, the processing section, when acquiring the equation, may firstly acquire the equation for the inspection region, modify the inspection region by extracting and removing a noise region based on the firstly acquired equation, and modify the equation based on the modified inspection region.

In one embodiment, the processing section may generate third image data by binarizing the second image data, and determine whether the appearance of the article is defective or not using the third image data.

According to an exemplary embodiment of the present invention, an appearance inspecting method for an article, using an appearance inspecting apparatus for an article, includes acquiring first image data for an inspection region including at least a portion of a captured image for at least a portion of appearance of the article, acquiring an equation that follows trend of levels of the first image data according to a location in the inspection region, and acquiring second image data based on relative levels between the equation and the levels of the first image data. The appearance inspecting method is performed by the appearance inspecting apparatus.

For example, the second image data may be obtained from a distance between the first image data and values according to the equation, for each location in the inspection region.

In one embodiment, the appearance inspecting method for an article, after acquiring second image data based on relative levels between the equation and the levels of the first image data, may further include determining whether the appearance of the article is defective or not based on the second image data. In determining whether the appearance of the article is defective or not based on the second image data, whether the appearance of the article is defective or not may be determined by applying plane inspection criteria to the second image data. Herein, the plane inspection criteria are inspection criteria that are applied in case that the inspection region corresponds to a plane.

For example, the first image data may include at least one of brightness data and height data.

In one embodiment, acquiring first image data for an inspection region including at least a portion of a captured image for at least a portion of appearance of the article may include establishing a target region in the captured image, acquiring a masking region that is to be excluded from the target region, and establishing the inspection region by excluding the masking region from the target region.

In one embodiment, acquiring an equation that follows trend of levels of the first image data according to a location in the inspection region may include establishing the inspection region as an effective region and firstly acquiring the equation for the effective region, modifying the effective region by extracting and removing a noise region based on the firstly acquired equation, and modifying the equation based on the modified effective region.

According to an exemplary embodiment of the present invention, a recording medium recording computer software for implementing the appearance inspecting method for an article may be provided.

Advantageous Effects

According to the present invention, second image data relative to an equation following trend of levels of first image data for an inspection region is acquired, and whether the appearance of the article is defective or not is determined based on the acquired second image data, thereby easily and precisely determining whether the appearance of the article is defective or not even though the appearance of the article does not have a flat plane shape, and easily determining whether the appearance of the article is defective or not by applying plane inspection criteria, which are applied in case that the inspection region corresponds to a plane, directly to the second image data.

Also, when the inspection region corresponds to a rounded portion, the equation may be obtained simply by performing curve-fitting with a curve equation or a curved surface equation having a second-order or more.

Also, when brightness data is employed as the first image data, the first image data may be easily obtained from the image-captured two-dimensional plane image, and when height data is employed as the first data, the first image data may be easily obtained from data acquired for measuring a three-dimensional shape.

In addition, when a hole and the like is formed in the article, the hole may be acquired as a masking region and excluded, thereby obtaining a more accurate inspection result.

Also, in the process of acquiring the equation, a more accurate equation may be acquired by modifying an effective region by removing the noise region from the inspection region and then modifying the equation, thereby obtaining a more accurate inspection result.

In addition, the second image data may be subjected to data processing or image processing such as binarization, various filtering, morphology processing, and the like, thereby obtaining a more accurate inspection result.

MODE FOR INVENTION

Figure 1:
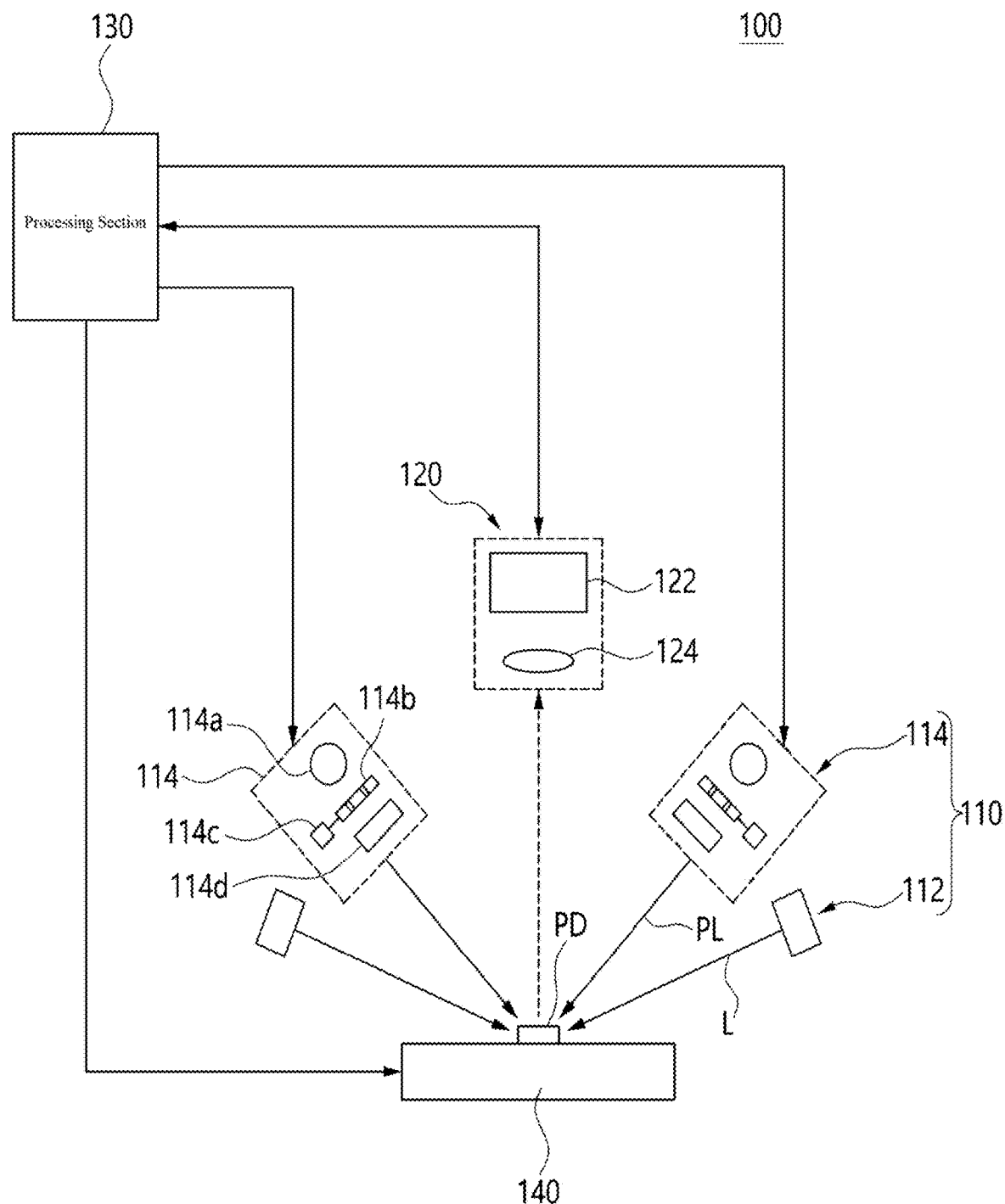
FIG. 1 is a conceptual view illustrating an appearance inspecting apparatus for an article according to an exemplary embodiment of the present invention.

The present invention is described more fully hereinafter with reference to the accompanying drawings, in which example embodiments of the present invention are shown. The present invention may, however, be embodied in many different forms and should not be construed as limited to the example embodiments set forth herein. Rather, these example embodiments are provided so that this disclosure will be thorough and complete, and will fully convey the scope of the present invention to those skilled in the art. In the drawings, the sizes and relative sizes of layers and regions may be exaggerated for clarity.

It will be understood that, although the terms first, second, etc. may be used herein to describe various elements, these elements should not be limited by these terms. These terms are only used to distinguish one element from another element. For example, a first element discussed below could be termed a second element, and similarly, a second element may also be termed a first element, without departing from the teachings of the present invention.

The terminology used herein is for the purpose of describing particular example embodiments only and is not intended to be limiting of the present invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, components, and/or groups thereof but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs.

It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The present invention may be illustrated as being implemented in a suitable computing environment. In addition, various methods according to the present invention may be provided as a recording medium that records a computer-software for implementing the methods.

The recording medium typically includes a variety of computer readable media, and may be provided as any available media that can be accessed by a computer. Further, the recording medium includes volatile or non-volatile media, removable or non-removable media, etc. For example, the recording medium may include all the media implemented in any method or technology for storage of information such as computer readable instructions, data structures, program modules or other data. In addition, the recording medium includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by a computer.

Hereinafter, exemplary embodiments of the present invention will be described in detail with reference to the accompanying drawings.

FIG. 1 is a conceptual view illustrating an appearance inspecting apparatus for an article according to an exemplary embodiment of the present invention.

Referring to FIG. 1, an appearance inspection apparatus 100 for an article according to an embodiment of the present invention includes an image acquiring section and a processing section 130.

The image acquiring section acquires a captured image of at least a portion of appearance of an article PD to be inspected. For example, the image acquiring section may acquire the captured image by directly image-capturing the article PD, or may acquire the captured image by externally receiving the captured image of the article PD. The captured image may include a two-dimensional plane image for at least a portion of the article PD described below, a pattern image for at least a portion of the article PD, and the like. The captured image may include an image having information on a two-dimensional shape or a three-dimensional shape and information on various attributes such as color, brightness, saturation, and the like.

In one embodiment, the image acquiring section may include a lighting section 110 and an image-capturing section 120.

The lighting section 110 provides light to the article PD.

The article PD may include a cellular phone, and for example, the article PD may include the body, case, cover, etc. of the cellular phone. In one embodiment, when the article PD is a rear case arranged to cover a cellular phone body such as a circuit board from the rear, the rear case of the cellular phone may be formed with various protrusions, depressions, holes, openings, etc. and the rear case may have a rectangular parallelepiped shape including a rounded portion on at least a portion.

The article PD may include other various shapes of products or workpieces, and may be an article having various shape features on the surface, such as protrusions, depressions, holes, openings, and the like.

In one embodiment, the lighting section 110 may include at least one of a first lighting section 112 and a second lighting section 114.

The first lighting section 112 may provide non-patterned light. The non-patterned light may be, for example, an illumination to obtain a plane image of a two-dimensional shape of the article PD. The plane image may contain at least one information of the color, brightness or saturation of the article PD.

In one embodiment, the first lighting section 112 may include a plurality of lighting units arranged in a circle with respect to the article PD, when viewed in a plane, to illuminate light L. For example, the first lighting section 112 may include a light source for emitting white light or monochromatic light of a predetermined color, and may irradiate different color lights of different colors such as red, green, and blue at different inclination angles, and respectively, a plurality of LEDs may be arranged continuously so as to have a ring shape.

The second lighting section 114 may provide a patterned light. The patterned light may be, for example, an illumination to obtain a pattern image from which a three-dimensional shape of the article PD may be extracted. In one embodiment, the second lighting section 114 may include a plurality of pattern light units arranged to illuminate the grating pattern PL sloping in different directions towards the article PD. For example, the second lighting section 114 may illuminate a grating pattern PL forming a grating pattern to obtain three-dimensional shape information of the article PD, in oblique directions based on a normal line perpendicular to the plane of the article PD. In addition, the second lighting section 114 may be disposed apart from the article PD in the circumferential direction around the article PD, or may be disposed at each vertex of a polygon around the article PD, and the second lighting section 114 may be alternately spaced equally at positions spaced around the circumference. The pattern light units of the second lighting section 114 may be provided with M (M is a natural number greater than or equal to 2), and M may be provided with various numbers of natural numbers such as 2, 4, or 8, for example.

In one embodiment, each pattern light unit of the second lighting section 114 may illuminate the grating pattern light PL N times toward the article PD (N is a natural number greater than or equal to 2). In order to irradiate a phase-shifted grating pattern light, the pattern light unit may use a pattern image employing a digital light processing (DLP) method using a digital micro-mirror display (DMD), or move a grating pattern N times using a pattern image of a liquid crystal display. The pattern light unit may move a grating pattern using a pattern image using various display methods. Alternatively, the grating pattern may be physically moved N times using a grating transfer mechanism.

In one embodiment, each pattern light unit of the second lighting section 114 may include a light source 114$a$, a grating 114$b$, a grating transfer mechanism 114$c$, and a projection lens part 114$d$.

The light source 114$a$ irradiates light toward the article PD. The grating 114$b$ converts the light emitted from the light source 114$a$ into a grating pattern light PL. The grating 114$b$ is moved N times by $2\pi/N$ through a grating transfer mechanism 114$c$ (N is a natural number greater than or equal to 2), such as a piezo actuator (PZT), to generate a phase-shifted grating pattern light PL. The projection lens part 114$d$ projects the grating pattern light PL generated by the grating 114$b$ onto the article PD. The projection lens part 114$d$ may be formed of, for example, a plurality of lens combinations, and focuses and projects the grating pattern light PL formed through the grating 114$b$ onto the article PD. Thus, each pattern light unit 110 irradiates the grating pattern light PL to the article PD at each transfer, while transferring the grating 114$b$ N times.

The image-capturing section 120 image-captures at least a portion of the appearance of the article PD based on the provided light to obtain a captured image.

In one embodiment, the image-capturing section 120 may obtain a two-dimensional plane image of the article PD based on non-patterned light of the first lighting section 112, and may obtain a pattern image for the article PD based on the patterned light of the second lighting section 114. Particularly, the image-capturing section 120 may obtain a two-dimensional plane image of the article PD by receiving light that is provided from the first lighting section 112 to the article PD and reflected by the article PD, and may obtain a pattern image of the article PD by receiving pattern light that is provided from the second lighting section 114 to the article PD and reflected by the article PD.

In one embodiment, the image-capturing section 120 may include a camera 122 and an imaging lens 124. For example, the camera 122 may employ a CCD or CMOS camera. The light or pattern light reflected from the article PD may be imaged by the imaging lens 124 and captured by the camera 122.

In one embodiment, the image-capturing section 120 may be installed in one or more. The image-capturing section 120 may be disposed over the article PD, and a plurality of image-capturing sections may be spaced apart from each other along the circumference of the article PD, or may be disposed at each vertex of a polygon around the article PD. The image-capturing sections may be alternately spaced equally at positions spaced around the circumference.

On the other hand, when the image-capturing section 120 is installed in plural, it is also possible to obtain the three-dimensional shape of the article PD by a well-known stereo method, in which case the second lighting section 114 may be employed but may be omitted.

The processing section 130 uses the captured image of the article PD to determine whether the appearance of the article is defective or not.

The processing section 130 acquires first data for an inspection region corresponding to at least a portion of the appearance of the article PD, acquires an equation representing the distribution of the first data according to the location in the inspection region, and acquires second data based on the relative relationship between the equation and the first data. Thus, the processing section 130 determines whether the appearance of the article PD is defective or not based on the second data.

Meanwhile, the appearance inspecting apparatus 100 for an article may further include a stage 140 fixing and supporting the article PD, and the processing section 130 or a separate transfer control device (not shown) may perform a control operation for moving the stage 140 and setting an inspection surface of the article PD. For example, in case that the article PD is a rear case of a cellular phone, The appearance inspection may be performed on the rear face and four sides defining the rear case of the cellular phone, so that the processing section 130 or a separate transfer control device may control transfer and rotation operations so as to automatically set the inspection surface on the stage 140.

Hereinafter, a process of determining whether or not the appearance is defective or not by the processing section 130 will be described in detail with reference to the drawings.

Figure 2:
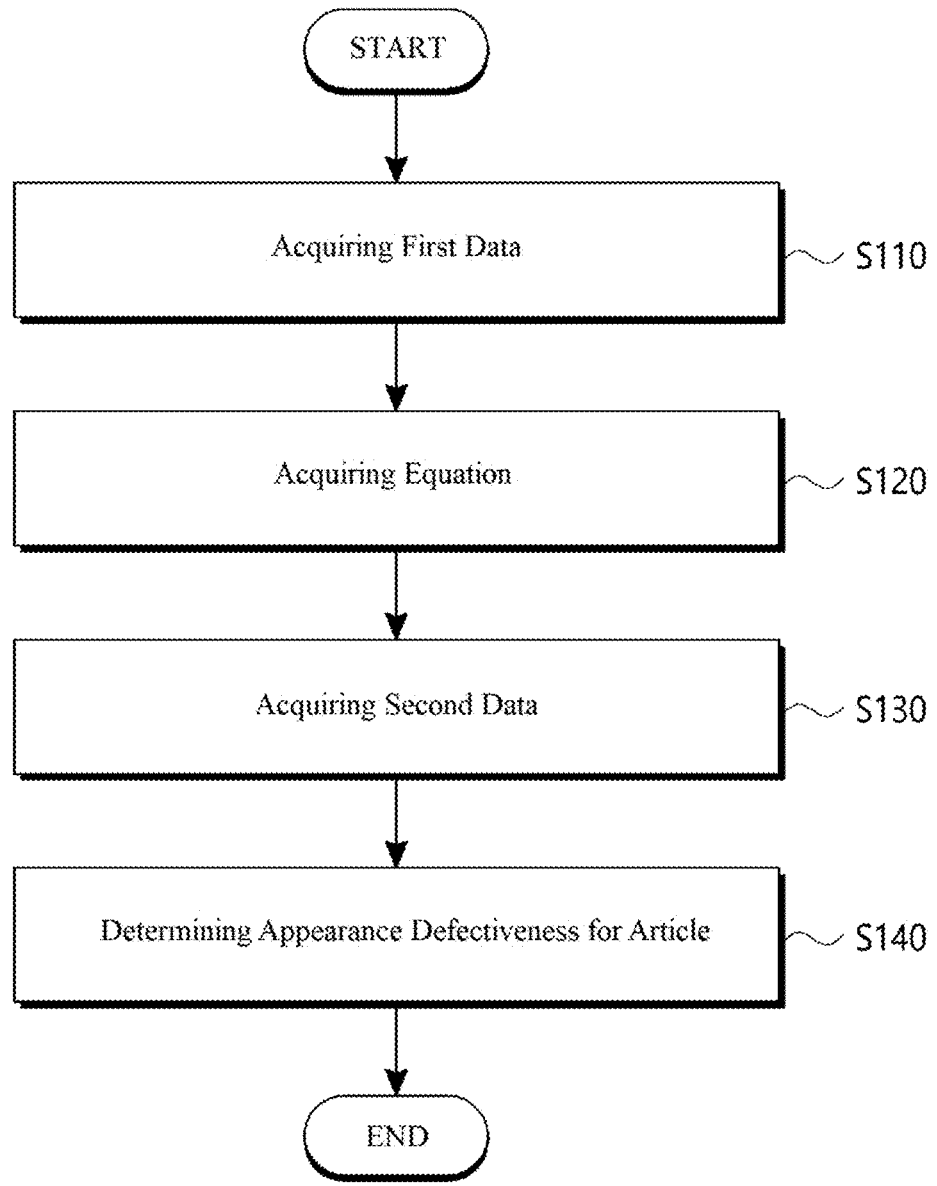
FIG. 2 is a flowchart showing an appearance inspecting method for an article according to an exemplary embodiment of the present invention.

FIG. 2 is a flowchart showing an appearance inspecting method for an article according to an exemplary embodiment of the present invention.

Referring to FIGS. 1 and 2, in order to inspect the appearance of the article PD according to an embodiment of the present invention, firstly, the processing section 130 acquires first data for an inspection region corresponding to at least a portion of the appearance of the article PD in step S110.

For example, at least a portion of the inspection region may correspond to a rounded portion of the article PD. The inspection region may be established one-dimensionally to inspect the article PD in one direction, and may be established two-dimensionally to inspect the article PD in a planar manner.

At least a portion of the inspection region may correspond to inclined portions of the article PD. That is, the inspection region may include various portions other than a flat, noninclined plane, and may include various portions forming the shape of the article PD, in addition to the rounded portions and inclined portions described above.

The inspection region may be established in various forms to inspect the appearance of the article PD. The inspection region may be established in a rectangular shape or another polygonal shape. In addition, the inspection region may be established as a figure including a curve, or may be formed as a contour according to the shape of the article PD.

Figure 3:
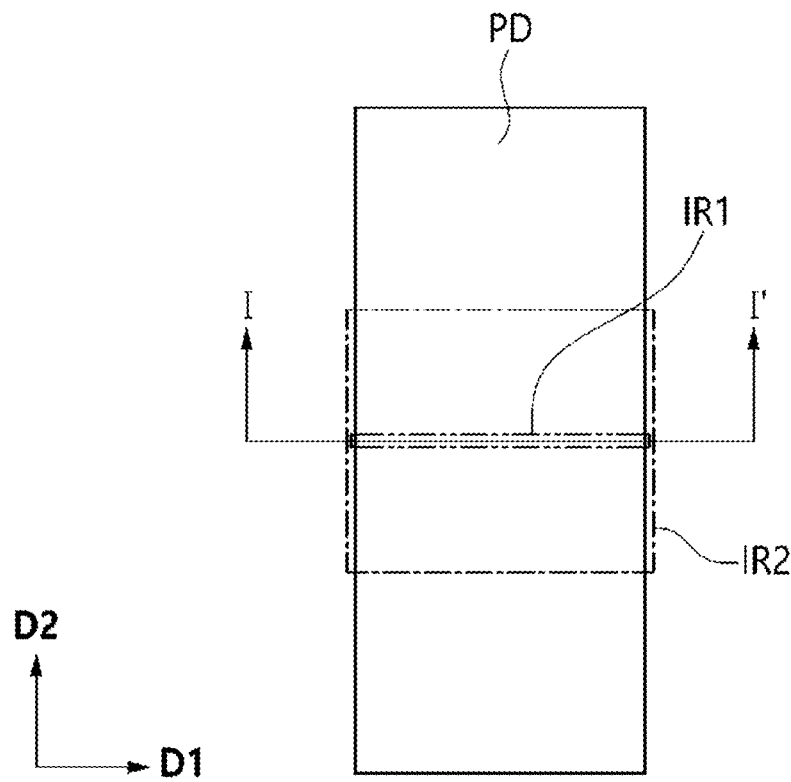
FIG. 3 is a plan view illustrating examples of inspection regions established for the appearance inspecting method for an article in FIG. 2.
Figure 4:
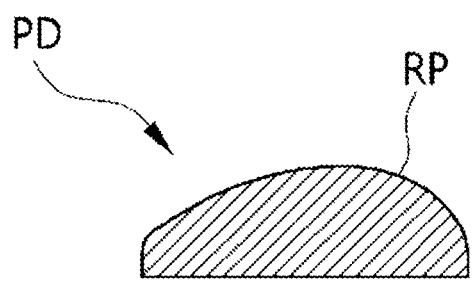
FIG. 4 is a cross-sectional view taken along a line I-I' of FIG. 3.

FIG. 3 is a plan view illustrating examples of inspection regions established for the appearance inspecting method for an article in FIG. 2. FIG. 4 is a cross-sectional view taken along a line I-I' of FIG. 3.

Referring to FIGS. 3 and 4, a first inspection region IR1 shown in FIG. 3 shows an example in which the inspection region is one-dimensionally established, a second inspection region IR2 shows an example in which the inspection region is two-dimensionally established. As shown in FIG. 4, the first and second inspection regions IR1 and IR2 may correspond to a rounded portion RP of the article PD.

In one embodiment, the article PD is a rear case of a cellular phone, and a portion of a side surface of the rear case is shown in FIGS. 3 and 4. The side surface of the rear case may be formed to include the rounded portion RP as shown in FIG. 4.

In one embodiment, the first data may include at least one of brightness data and height data. Alternatively, the first data may include various data obtainable from the plane image, and may include, for example, color, brightness, saturation, and the like. Also, the first data may include various data related to the shape of the article PD, and may include, for example, three-dimensional spatial coordinates, curvature, radius of curvature, and the like.

The brightness data may be obtained from the data obtained based on the first lighting section 112 or from a two dimensional plane image, and the height data may be obtained from the data obtained based on the second lighting section 114 or from a three dimensional shape.

That is, when the brightness data is employed as the first data, the first data may be easily obtained from the captured 2D plane image, and when the height data is employed as the first data, the first data may be easily obtained from the data acquired for measuring a three-dimensional shape.

In case that the inspection region includes an area to be excluded from the inspection, the area to be excluded may be excluded in step S110 of acquiring the first data.

Figure 5:
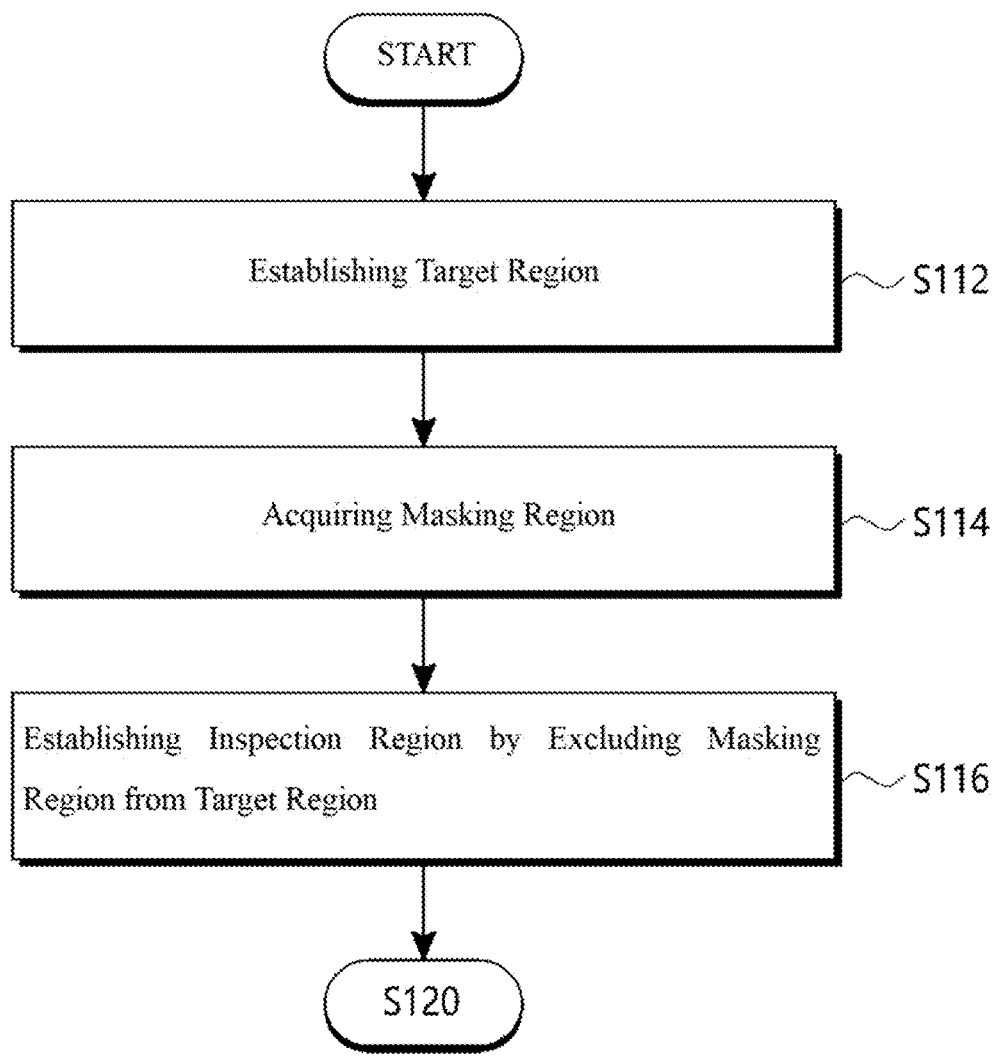
FIG. 5 is a flowchart showing an example of acquiring first data in the appearance inspecting method for an article in FIG. 2.
Figure 6:
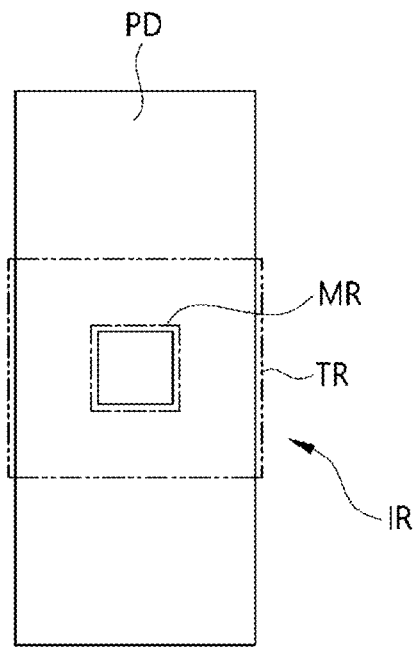
FIG. 6 is a plan view for explaining the example of acquiring the first data in FIG. 5.

FIG. 5 is a flowchart showing an example of acquiring first data in the appearance inspecting method for an article in FIG. 2. FIG. 6 is a plan view for explaining the example of acquiring the first data in FIG. 5.

Referring to FIGS. 5 and 6, in one embodiment, in order to obtain the first data for the inspection region corresponding to at least a portion of the appearance of the article PD in step S110, firstly, a target region TR corresponding to at least a portion of the appearance of the article PD is established in step S112.

The target region TR may be a region of a two-dimensional rectangular shape, for example, as shown in FIG. 6.

Then, a masking region MR that is to be excluded from the target region TR is acquired in step S114.

The masking region MR may be a part that does not correspond to the article PD and may be excluded. For example, when the article PD is a rear case of a cellular phone, the masking region MR may include a plurality of holes and openings formed for realizing the function of the cellular phone, such as a hole for externally exposing a button formed on a cellular phone body, a hole formed corresponding to a microphone or speaker of a cellular phone body, a hole for externally exposing a terminal for input/output connection to a cellular phone body, a hole for camera capturing, a space corresponding to a position where the battery is mounted, and the like.

For example, the processing section 130 may acquire a region of the first data beyond a predetermined range as the masking region.

In one embodiment, when the first data includes brightness data, in order to obtain the masking region MR to be excluded from the target region TR, the masking region MR may be obtained from a region where the brightness data is beyond the predetermined reference brightness range.

In one embodiment, when the first data includes height data, in order to obtain the masking region MR to be excluded from the target region TR, the masking region MR may be obtained from a region where the height data is beyond the predetermined reference height range.

Alternatively, when a shape corresponding to the pre-registered shape is included, a step of acquiring the masking region MR from a region corresponding to the registered shape may be included.

Thereafter, an inspection region IR is established by excluding the masking region MR from the target region TR in step S116.

For example, in FIG. 6, the inspection region IR is the remaining region except for the masking region MR having a small rectangular shape in the target region TR having a large rectangular shape.

As described above, when a hole and the like is formed at the article PD, the hole and the like may be acquired as a masking region and excluded, and thus more accurate inspection results may be obtained.

Referring again to FIG. 1 and FIG. 2, the processing section 130 then acquires an equation representing distribution of the first data according to locations in the inspection region in step S120.

In one embodiment, the inspection region may be a one-dimensional region, for example, a first inspection region IR1 as shown in FIG. 3. In this case, the equation representing the distribution of the first data may be an equation for the one-dimensional region, for example, at least a second order or higher curve equation. For example, the curve equation may be obtained by curve-fitting the distribution of the first data.

Figure 7:
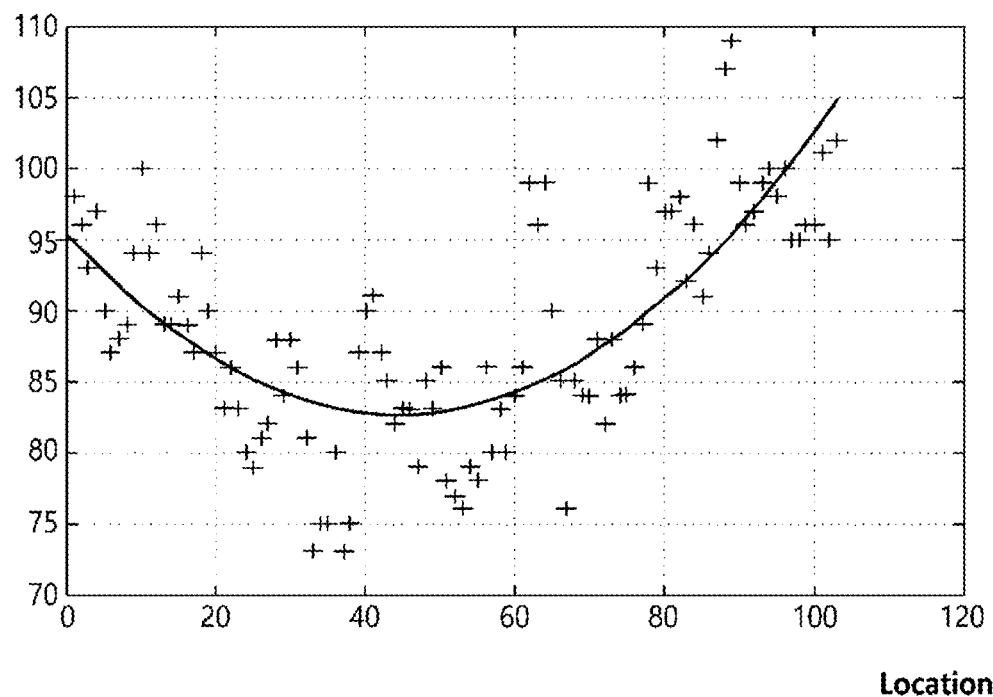
FIG. 7 is a graph showing an example of distribution of the first data and an equation according to the distribution in acquiring the equation in FIG. 2.

FIG. 7 is a graph showing an example of distribution of the first data and an equation according to the distribution in acquiring the equation in FIG. 2.

Referring to FIG. 7, the gray level of the brightness data of each location obtained according to the location in D1-direction of the first inspection region IR1 may be expressed as a two-dimensional graph, and the X-axis of the graph represents the location according to the D1-direction, and the Y-axis represents the gray level of the corresponding location.

As shown in the graph of FIG. 7, it may be assumed that the trend of the gray level follows roughly a curve equation of a second order or higher, and thus an equation representing the distribution of the first data may be acquired by curve-fitting with a quadratic curve equation. Herein, "follow" the trend of the level may be the same concept as "represent" the trend of the level, "approximate" the trend of the level, "show" the trend of the level, and the like, and may include other equivalent concepts.

For example, the equation may be modeled as Equation 1.

$$f(x)=ax^2+b \qquad \text{[Equation 1]}$$

In another embodiment, the inspection region may be a two-dimensional region, for example, a second inspection region IR2 as shown in FIG. 3. In this case, the equation representing the distribution of the first data may be an equation for the two-dimensional region, and may be, for example, a curved surface equation of at least a second order or higher. For example, the curved surface equation may be obtained by curve-fitting the distribution of the first data.

Although not shown, the gray level of the brightness data of each location obtained according to the location in D1-direction and D2-direction of the second inspection region IR2 may be expressed in a three-dimensional graph, and the X-axis of the graph represents the location according to the D1-direction, the Y-axis of the graph represents the location according to the D2-direction, and the Z-axis represents the gray level of the corresponding location.

It may be assumed that the trend of the gray-level follows roughly a second-order or higher-order curved surface equation, and thus an equation representing the distribution of the first data may be obtained by curve-fitting with a quadratic curved surface equation. For example, the equation may be modeled as Equation 2.

$$f(x,y)=ax^2+by^2+cxy+dx+ey+f \qquad \text{[Equation 2]}$$

As shown in FIG. 4, when the inspection region corresponds to a rounded portion RP, the equation may be obtained simply by performing curve-fitting with a curve equation or a curved surface equation of a second order or higher as described above.

On the other hand, when the inspection region is a two-dimensional region, firstly, equations for one-dimensional regions forming the two-dimensional inspection region are obtained, and then an equation for the two-dimensional inspection region may be obtained based on the equations for the one-dimensional regions. That is, the two-dimensional inspection region is divided into one-dimensional regions, and the equations for the divided one-dimensional regions are obtained. Then, the equations for the divided one-dimensional regions are placed, to derive the equation for the two-dimensional inspection region.

Meanwhile, the first data may include noise, and in this case the equation is difficult to represent accurate trend of the first data. Thus, in step S120 of obtaining an equation representing the variation of the first data according to the location in the inspection region, a more accurate equation may be obtained through noise removal.

Figure 8:
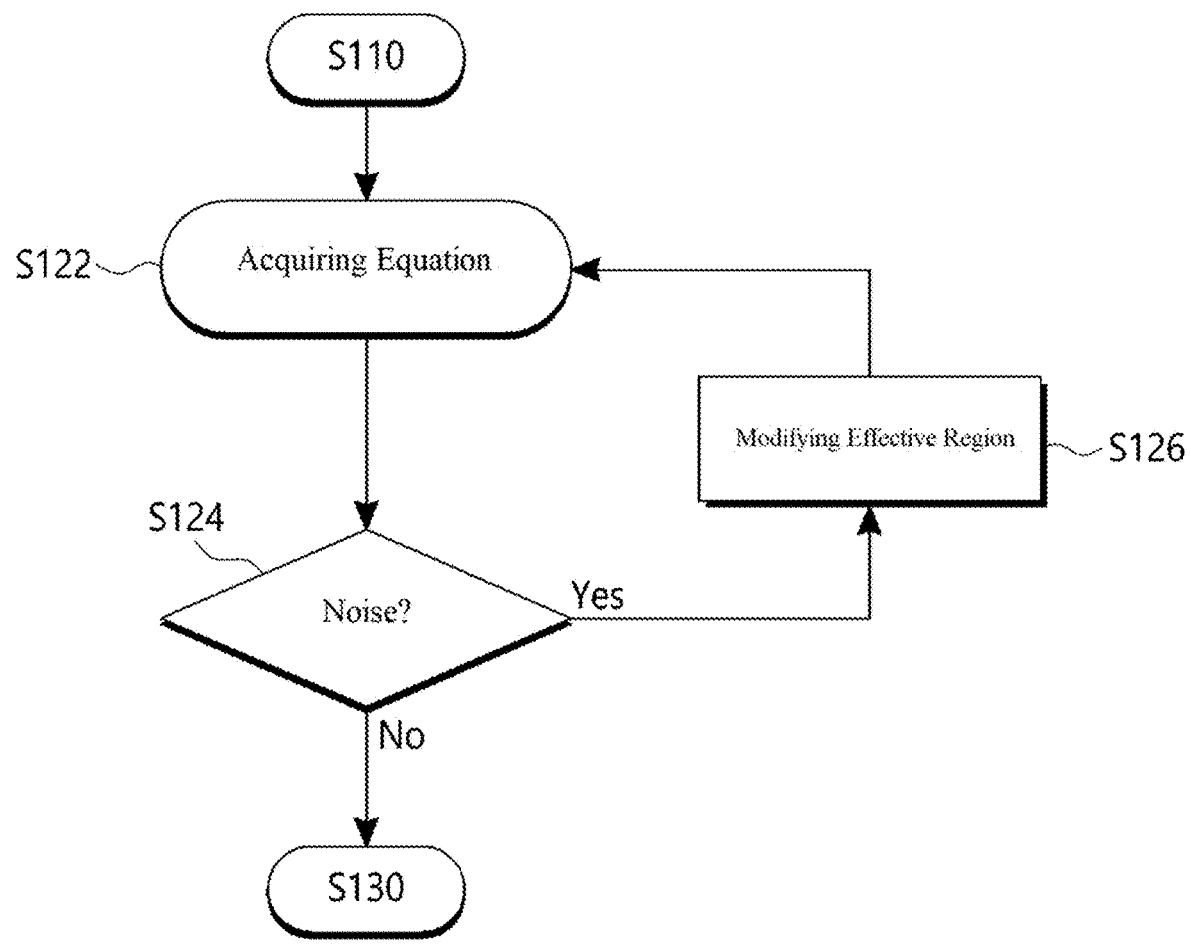
FIG. 8 is a flowchart showing an example of acquiring an equation in the appearance inspecting method for an article in FIG. 2.

FIG. 8 is a flowchart showing an example of acquiring an equation in the appearance inspecting method for an article in FIG. 2.

Referring to FIG. 8, in one embodiment, in order to obtain an equation representing a variation of the first data according to the location in the inspection region in step S120, firstly, the inspection region is established as an effective region in step S122. Then, a noise region is extracted based on the firstly acquired equation in steps S124, and the effective region is modified by removing the noise region in step S126. Thereafter, the equation is modified based on the modified effective region is step S122.

For example, first, the inspection region is established by an effective region, which is the effective for acquiring the equation, and the equations is acquired firstly for the effective region. Then, since values that deviate from predetermined reference values in the firstly acquired equation may not be considered as valid values, the deviating values are determined as noise, and excluded from the effective region, thereby modifying the effective region. The noise may be a stain or a scratch corresponding to a defect in determining whether the appearance PD of the article PD is defective or not, which is described later. These defective regions may also be excluded from the effective region in this process.

By acquiring the equation again based on the modified effective region, the firstly acquired equation may be modified. This process may be repeated once or more than once.

As described above, in acquiring the equation, the noise region is extracted to modify the effective region and then modify the equation, thereby acquiring a more accurate equation, and accordingly acquiring more accurate inspection results.

Referring again to FIGS. 1 and 2, thereafter, the processing section 130 obtains second data based on relative relationship between the equation and the first data in step S130.

In one embodiment, the second data may be obtained from a distance between the first data and the values according to the equation, for each location in the inspection region. For example, in order to obtain the second data, the processing section 130 may obtain the second data by subtracting the values according to the equation from the first data for each location in the inspection region. In other words, second data corresponding to the values of the first data relative to the equation at the associated location may be obtained, and may be obtained by simply subtracting equation 1 or equation 2 from the first data.

Figure 9:
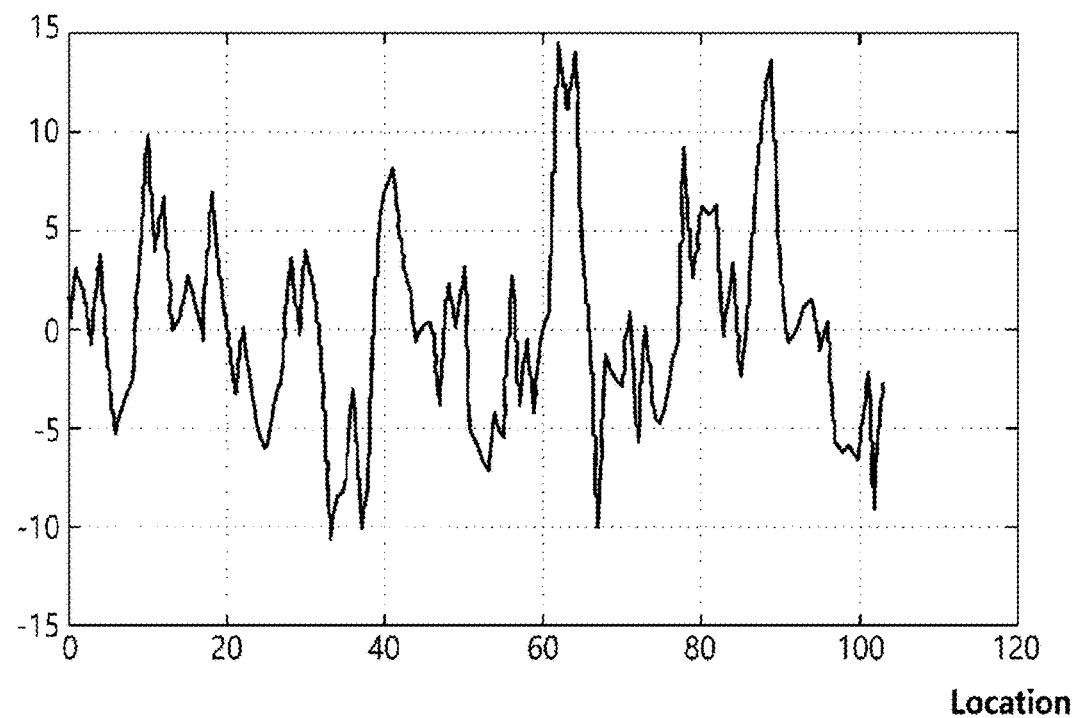
FIG. 9 is a graph in which distribution of second data for each location extracted from the graph in FIG. 7 is expressed as a broken line.

FIG. 9 is a graph in which distribution of second data for each location extracted from the graph in FIG. 7 is expressed as a broken line.

Referring to FIG. 9, the gray level of the second data obtained by subtracting Equation 1 at the corresponding location from the brightness data for each location obtained according to the location in D1-direction of the first inspection region IR1 may be expressed as a two-dimensional graph. Herein, the X axis of the graph represents the location along the D1-direction, and the Y axis represents the relative gray level at the associated location.

As shown in the graph of FIG. 9, it may be seen that the trend of the gray level is spaced up and down with respect to the point where the gray level value is zero. Thus, it may be determined more easily whether the appearance PD of the article PD is defective or not, which is described later.

Particularly, it may be seen that the trend of the gray level of the second data shown in FIG. 9 is modified to follow the constant value '0' from following the quadratic curve equation. The reason why the trend of the gray level of the first data follows the second and higher curve equation instead of following the constant value is that the inspection region corresponds to the rounded portion RP (see FIG. 4). On the other hand, the trend of the gray level of the second data follows the constant value, so it may be regarded that the trend of the gray level of the second data has the same trend as gray level of a plane having no rounded portions. Accordingly, the processing section 130 may determine whether the appearance of the article PD is defective or not by applying plane inspection criteria to the second data. The plane inspection criteria are inspection criteria that are applied in case that the inspection region corresponds to a plane. For example, the plane inspection criteria may include specific inspection criteria for judging whether brightness, color, height, etc. are uniformly distributed, which may be applied for determining appearance defectiveness of an article comprised of a flat plane, for example, such as foreign matter adhesion, scratches, surface stains, etc.

Based on the second data thus obtained, it may be directly determined whether the appearance of the article PD is defective or not in the processing section 130, as described below. Alternatively, a separately provided determination means may determine whether the appearance of the article PD is defective or not based on the second data, and an operator may determine whether the appearance PD of the article PD is defective or not based on the second data.

Referring again to FIG. 1 and FIG. 2, in one embodiment, the processing section 130 determines whether the appearance of the article PD is defective or not based on the second data in step S140.

The appearance defectiveness of the article PD may be caused by a variety of causes and may result in a variety of results. For example, the appearance defectiveness of the article PD may include at least one of foreign matter adhesion, scratches and surface stains. Particularly, the article PD may adhere with sticking foreign matter or scratch during the manufacturing process, and an anodizing process may result in stains, thereby incurring the appearance defectiveness as described above.

In order to determine an appearance defectiveness such as the above, it may be checked whether there is a region with a different brightness distribution and/or height distribution in the inspection region in comparison with surroundings.

In one embodiment, in order to determine whether the appearance of the article PD is defective or not based on the second data in step S140, the second data may be binarized to generate third data, and it may be determined whether the appearance of the article PD is defective or not by using the generated third data.

For example, the third data may be generated by performing a binarization process in which the second data are compared with a predetermined threshold and '1' is assigned to a larger value and '0' is assigned to a smaller value. Accordingly, the third data may express extremely bright only for regions having different distributions from the surroundings, and thus it may be easily determined whether the appearance of the article PD is defective or not.

Herein, after the second data is binarized to generate the third data, the third data may be morphologically processed. A portion of the third data may be extracted and subjected to morphology processing.

The morphology processing may include an erode operation that narrows the associated area, a dilate operation that enlarges the associated area, an open operation that removes a detail area from the associated area, a close operation in which the gaps in the associated area are closed, and the like. The image processing such as changing the associated area to be wider or narrower in the inspection region may be performed, to thereby easily extract a region having a different distribution from the surroundings.

On the other hand, before generating the third data by binarizing the second data, the second data may be subjected to garbage wavelet filtering.

By the filtering process, the second data may be modified to more emphasize linearity. Thus, when determining whether the appearance of the article PD is defective or not by using the third data, the scratch defect of the article PD may be more easily determined, and the problem that scratch defect may not be properly revealed by the morphology processing may be prevented.

Since the Gabor wavelet filtering process may be used mainly to more easily grasp the scratch defect, the Gabor wavelet filtering process may be selectively applied. After applying both the case that the process is adopted and the case that the process is not adopted, results of the both cases may be gathered to finally determine whether the appearance is defective or not.

Furthermore, various filtering operations that are well known may be additionally performed for more accurate and effective data processing.

As described above, by performing data processing or image processing for the second data such as binarization, various filtering, morphology processing, etc., more accurate inspection results may be obtained.

FIGS. 10 to 13 are examples of images according to various data formed by the appearance inspecting method for an article according to an exemplary embodiment of the present invention. For example, the images represent examples of side surfaces of the cellular phone case where button holes are formed, which correspond to examples having rounded portions as shown in FIG. 4.

Figure 10:
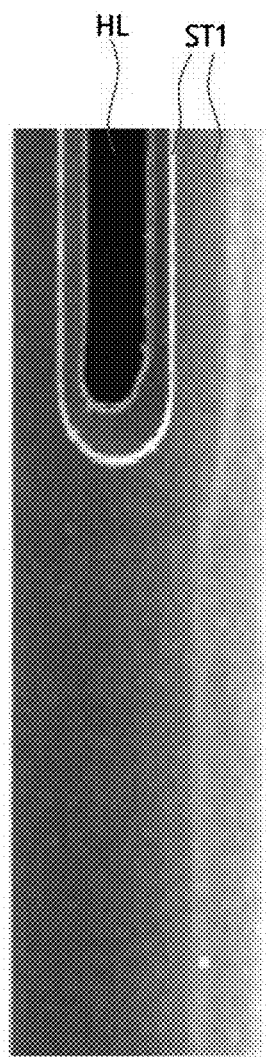
FIGS. 10 to 13 are examples of images according to various data formed by the appearance inspecting method for an article according to an exemplary embodiment of the present invention.
Figure 11:
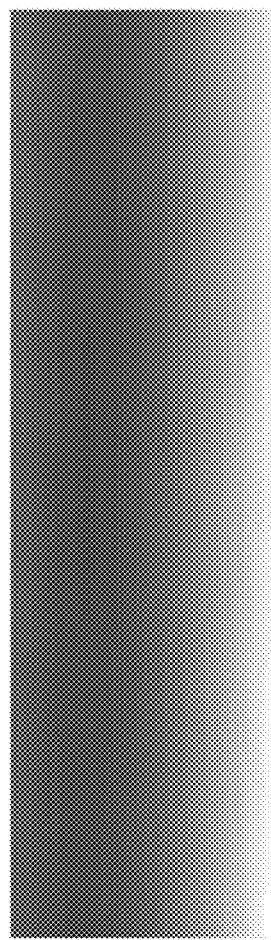
Figure 12:
Figure 13:
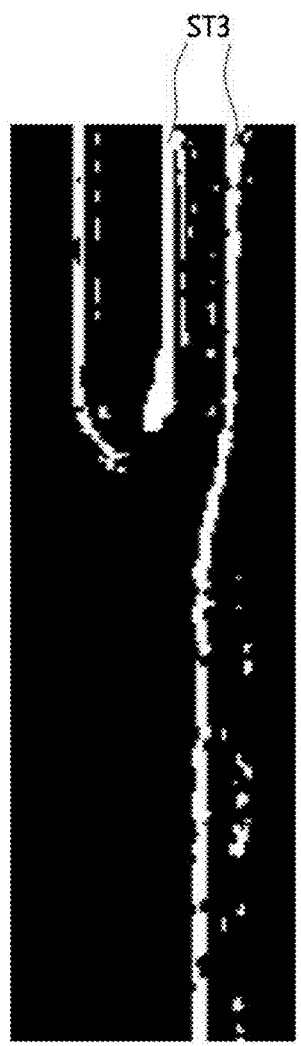

FIG. 10 is an image corresponding to the first data obtained according to step S110 in FIG. 2, which is the actual captured image of the article PD, and FIG. 11 is an image corresponding to the curved surface equation representing the distribution of the first data obtained according to step S120 in FIG. 2. FIG. 12 is an image corresponding to the second data obtained according to step S130 in FIG. 2, and FIG. 13 is a binarized image obtained for determining whether a defect is caused or not according to step S140 in FIG. 2.

Referring to FIGS. 10 to 13, it may be seen that a stain in the actual captured image of the article PD appears as a portion which may be clearly determinable as an appearance defectiveness through the above-described process.

As shown in FIG. 10, in the actual captured image of the article PD corresponding to the first data, there exists a first stain ST1 and a hole HL that may be visually confirmable in the article PD.

In order to determine whether the first stain ST1 is defective or not by the appearance inspecting apparatus 100 for an article (see FIG. 1), a curved surface equation, which is an equation representing the distribution of the first data except the hole HL, may be obtained, and the according image may be expressed as shown in FIG. 11.

The image according to the curved surface equation shown in FIG. 11 is subtracted from the image corresponding to the first data shown in FIG. 10, to thereby obtain an image according to the second data as shown in FIG. 12. In FIG. 12, the first stain ST1 appears as a second stain ST2, and the overall gradation due to the rounded portion may be mostly removed.

The second data are binarized, and various image processes are optionally performed, to obtain a final image for determining whether the appearance is defective or not as shown in FIG. 13. In FIG. 13, the second stain ST2 appears to be clearly revealed as a third stain ST3, and the overall gradation due to the rounded portion may be almost removed.

According to the appearance inspecting apparatus for an article and the appearance inspecting method for an article, the second data relative to the equation representing the distribution of the first data for the inspection region are obtained, and it is determined whether the appearance of the article is defective or not based on the second data, thereby easily and precisely determining whether the appearance of the article is defective or not even though the appearance of the article does not have a flat plane shape, and easily determining whether the appearance of the article is defective or not by applying plane inspection criteria, which are applied in case that the inspection region corresponds to a plane, directly to the second data.

It will be apparent to those skilled in the art that various modifications and variations may be made in the present invention without departing from the spirit or scope of the invention. Thus, it is intended that the present invention cover the modifications and variations of this invention provided they come within the scope of the appended claims and their equivalents.

The invention claimed is:

1. An appearance inspecting apparatus for an article, comprising:
an image acquiring device acquiring a captured image for at least a non-plane portion of appearance of the article; and
a processing device that uses the captured image of the article to determine whether the appearance of the article is defective or not, wherein
the processing device acquires first image data for an inspection region including the non-plane portion of the captured image, acquires an equation that follows trend of levels of the first image data according to a location in the inspection region, and acquires second image data based on relative levels between the equation and the levels of the first image data,
the equation represents distribution of the first image data,
the processing device determines whether the appearance of the article is defective or not based on the second image data,
the article includes the non-plane portion, and the processing device determines whether the appearance of the article is defective or not by applying inspection criteria to the second image data, and
the second image data is acquired from a distance between the first image data and a value according to the equation, with respect to each location in the inspection region.

2. The appearance inspecting apparatus for an article of claim 1, further comprising at least one of:
a first lighting device providing non-patterned light; and
a second lighting device providing patterned light,
wherein the first image data includes at least one of brightness data acquired from the first lighting device and height data acquired from the second lighting device.

3. The appearance inspecting apparatus for an article of claim 1, wherein the inspection region is a one-dimensional region or a two-dimensional region, and the equation that follows trend of levels of the first image data is an equation for a region having a same dimension as the inspection region.

4. The appearance inspecting apparatus for an article of claim 1, wherein the inspection region is a two-dimensional region, and
wherein the processing device acquires equations for one-dimensional regions forming the two-dimensional inspection region, and acquires an equation for the two-dimensional inspection region based on the equations for the one-dimensional regions.

5. The appearance inspecting apparatus for an article of claim 1, wherein the processing device establishes a target region in the captured image, acquires a masking region that is to be excluded from the target region, and establishes the inspection region by excluding the masking region from the target region.

6. The appearance inspecting apparatus for an article of claim 1, wherein the processing device,
when acquiring the equation, establishes the inspection region as an effective region and firstly acquires the equation for the effective region,
modifies the effective region by extracting and removing a noise region based on the firstly acquired equation, and
modifies the equation based on the modified effective region.

7. The appearance inspecting apparatus for an article of claim 1, wherein the processing device,
generates third image data by binarizing the second image data, and
determines whether the appearance of the article is defective or not using the third image data.

8. The appearance inspecting apparatus for an article of claim 1, wherein
the applying the inspection criteria to the second image data includes applying plane inspection criteria to the second image data, and
the plane inspection criteria are inspection criteria that are applied in case that the inspection region corresponds to a plane.

9. An appearance inspecting method for an article, using an appearance inspecting apparatus for an article, the appearance inspecting method performed by the appearance inspecting apparatus comprising:
acquiring first image data for an inspection region including at least a portion of a captured image for at least a non-plane portion of appearance of the article;
acquiring an equation that follows trend of levels of the first image data according to a location in the inspection region, wherein the equation represents distribution of the first image data;
acquiring second image data based on relative levels between the equation and the levels of the first image data; and
determining whether the appearance of the article is defective or not based on the second image data, wherein
the article includes the non-plane portion, and whether the appearance of the article is defective or not is determined by applying inspection criteria to the second image data, and
the second image data is acquired from a distance between the first image data and a value according to the equation, with respect to each location in the inspection region.

10. The appearance inspecting method for an article of claim 9, wherein acquiring first image data for an inspection region including at least a portion of a captured image for at least a non-plane portion of appearance of the article, comprises:
establishing a target region in the captured image;
acquiring a masking region that is to be excluded from the target region; and
establishing the inspection region by excluding the masking region from the target region.

11. The appearance inspecting method for an article of claim 9, wherein acquiring an equation that follows trend of levels of the first image data according to a location in the inspection region, comprises:
establishing the inspection region as an effective region and firstly acquiring the equation for the effective region,
modifying the effective region by extracting and removing a noise region based on the firstly acquired equation, and
modifying the equation based on the modified effective region.

12. The appearance inspecting method for an article of claim 9, wherein
 the applying the inspection criteria to the second image data includes applying plane inspection criteria to the second image data, and
 the plane inspection criteria are inspection criteria that are applied in case that the inspection region corresponds to a plane.

\* \* \* \* \*